US009441781B2

(12) United States Patent
Bevirt et al.

(10) Patent No.: US 9,441,781 B2
(45) Date of Patent: Sep. 13, 2016

(54) POSITIONING APPARATUS FOR PHOTOGRAPHIC AND VIDEO IMAGING AND RECORDING AND SYSTEM UTILIZING SAME

(71) Applicant: Motrr LLC, Santa Cruz, CA (US)

(72) Inventors: JoeBen Bevirt, Santa Cruz, CA (US);
Josh Guyot, Deer Isle, ME (US)

(73) Assignee: Motrr LLC, Santa Cruz, CA (US)

( * ) Notice: Subject to any disclaimer, the term of this patent is extended or adjusted under 35 U.S.C. 154(b) by 1 day.

(21) Appl. No.: 13/676,128

(22) Filed: Nov. 14, 2012

(65) Prior Publication Data
US 2013/0229569 A1    Sep. 5, 2013

Related U.S. Application Data

(60) Provisional application No. 61/559,151, filed on Nov. 14, 2011, provisional application No. 61/620,360, filed on Apr. 4, 2012, provisional application No. 61/665,872, filed on Jun. 28, 2012, provisional application No. 61/500,585, filed on Feb. 18, 2012.

(51) Int. Cl.
*F16M 11/12* (2006.01)
*F16M 11/18* (2006.01)
*F16M 13/00* (2006.01)

(52) U.S. Cl.
CPC .............. *F16M 11/18* (2013.01); *F16M 11/12* (2013.01); *F16M 13/00* (2013.01)

(58) Field of Classification Search
CPC .......... H04N 5/2251; H04N 5/23203; F16M 11/12; F16M 11/18; F16M 13/00
USPC .......................... 348/211.99–211.4, 373–376
See application file for complete search history.

(56) References Cited

U.S. PATENT DOCUMENTS

| | | | | |
|---|---|---|---|---|
| 5,768,648 | A * | 6/1998 | Skipp et al. | 396/428 |
| 6,354,750 | B1 * | 3/2002 | Romanoff | 396/428 |
| 6,708,943 | B2 * | 3/2004 | Ursan et al. | 248/660 |
| 2006/0239677 | A1 * | 10/2006 | Friedrich | 396/419 |
| 2006/0269278 | A1 * | 11/2006 | Kenoyer et al. | 396/428 |
| 2007/0251408 | A1 * | 11/2007 | Fletcher et al. | 104/247 |
| 2010/0079101 | A1 * | 4/2010 | Sidman | 318/649 |
| 2011/0228098 | A1 * | 9/2011 | Lamb et al. | 348/164 |

* cited by examiner

*Primary Examiner* — Timothy J Henn

(57) ABSTRACT

A multi-axis positioning device adapted to hold and position an electronic device such as a smart phone. A system using the positioning device and a smart phone adapted to utilize the smart phone to provide positioning commands to the positioning device. The system may provide positioning commands based upon pre-programmed instructions, or may position based upon analysis of the images being taken in real time.

12 Claims, 17 Drawing Sheets

POSITIONING APPARATUS FOR PHOTOGRAPHIC AND VIDEO IMAGING AND RECORDING AND SYSTEM UTILIZING SAME

CROSS-REFERENCE TO RELATED APPLICATIONS

This application claims priority to U.S. Provisional Patent Application No. 61/559,151, filed Nov. 14, 2011, which is hereby incorporated by reference. This application claims priority to U.S. Provisional Patent Application No. 61/600,585, filed Feb. 18, 2012, which is hereby incorporated by reference in its entirety. This application claims priority to U.S. Provisional Patent Application No. 61/620,360, filed Apr. 4, 2012, which is hereby incorporated by reference in its entirety. This application claims priority to U.S. Provisional Patent Application No. 61/665,872, filed Jun. 28, 2012, which is hereby incorporated by reference in its entirety.

BACKGROUND

1. Field of the Invention

The present invention relates to a tracking system for cameras, and more specifically to a mounting apparatus adapted to track a viewed image.

2. Description of Related Art

Modern electronic devices, such as tablet computers and smart phones, may be adapted to run software which allows them to control other devices, such as mechanical devices. Also, these devices may also include cameras which allow for photographic or video recording, or transmitting of the images in real time.

What is called for is a positioning apparatus mounted to a camera, such as in a smart phone, which is also able pivot around more than one axis. The system should allow the smart phone to give positioning commands to the positioning apparatus, according to pre-programmed instructions, real time instructions based upon image analysis, commands given over the internet, or according to other methods.

What is also called for is a system wherein a tablet may be used to control a camera mounted onto a positioning apparatus. The user may touch the tablet and move a finger and thus pivot the camera while simultaneously displaying an image from the pivoting camera on the tablet being used to control the camera.

SUMMARY

A multi-axis positioning device adapted to hold and position an electronic device such as a smart phone. A system using the positioning device and a smart phone adapted to utilize the smart phone to provide positioning commands to the positioning device. The system may provide positioning commands based upon pre-programmed instructions, or may position based upon analysis of the images being taken in real time. A system wherein a mobile touch device may be used to control the pointing direction of the camera, and wherein the same mobile touch device may display the image coming from the camera in real time.

DETAILED DESCRIPTION

Figure 1:
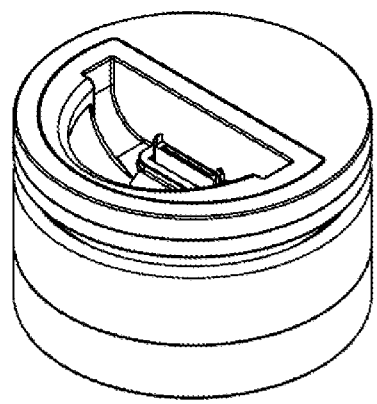
FIG. 1 is a perspective view of a positioning apparatus according to a first embodiment of the present invention.
Figure 2:
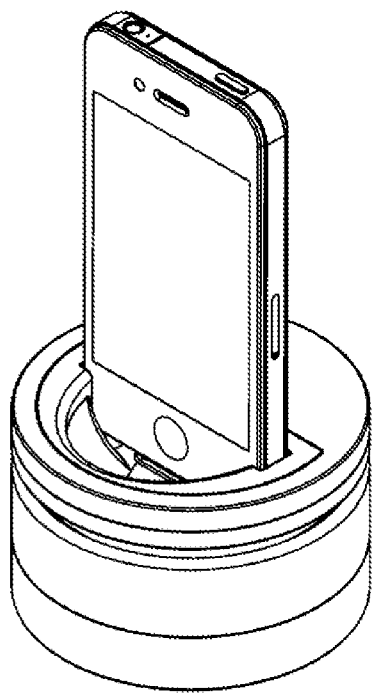
FIG. 2 is a perspective view of a positioning system according to a first embodiment of the present invention.
Figure 3:
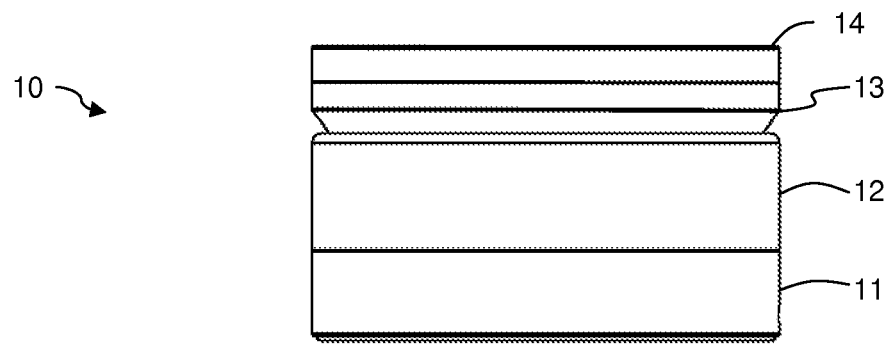
FIG. 3 is a front view of a positioning apparatus according to a first embodiment of the present invention.
Figure 4:
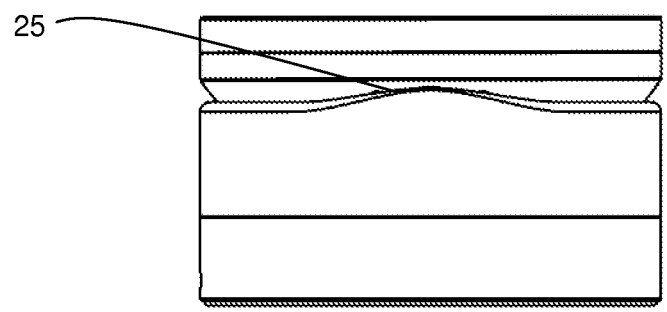
FIG. 4 is a rear view of a positioning apparatus according to a first embodiment of the present invention.
Figure 5:
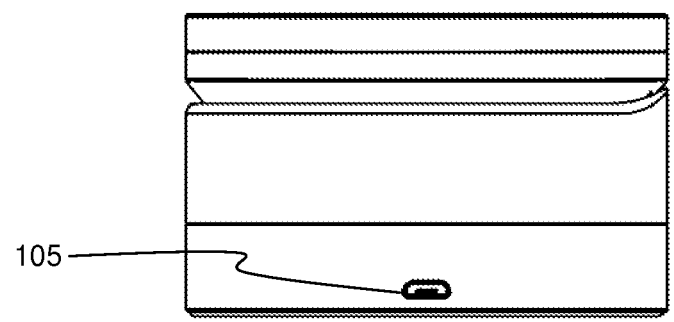
FIG. 5 is a side view of a positioning apparatus according to a first embodiment of the present invention.

FIG. 1 illustrates a positioning apparatus according to some embodiments of the present invention. In some embodiments, the positioning apparatus may be adapted to rotate an electronic device in two axes, while further being able to have the angle between the two rotation axes be set by the user. The positioning apparatus may be adapted to support a smart phone, as seen in the positioning system illustration of FIG. 2.

In some embodiments of the present invention, as seen in FIGS. 3-12, a positioning apparatus 10 is adapted to be driven in a plurality of axes by an electronic device mounted therein. The electronic device may be a smart phone in some embodiments. The electronic device may be a tablet computer in some embodiments. The positioning apparatus may be able to position the device, which may include a camera, such that the camera is able to take pictures while tracking a moving object, for example. In some embodiments, the electronic device/camera is able to send positioning command signals to the positioning device such that the camera is able to take images in a variety of positions. In some embodiments, the electronic device/camera may be able to receive commands via cell phone signal, or other wireless transmission mode, which then result in the electronic device/camera to then command the positioning apparatus to alter the orientation of the electronic device/camera. In some embodiments, the electronic device/camera may transmit images to a remote device, such as another smart phone, allowing the user of the remote device to observe the images being taken by the first device in real time. The user of the remote device may then be able to command the positioning apparatus, allowing for control and tracking of the positioning apparatus and first device by the second device.

In some embodiments, the positioning device is adapted to receive position commands from the electronic device, which may be smart phone, and to respond by moving to a commanded orientation. In some embodiments, the positioning device is self-reliant in that it has power, electromechanical drivers, and control electronics such that it can move to the commanded orientation based upon simple commands coming from the smart phone. In some embodiments, the smart phone is mounted to the positioning device such that an electrical connector on the smart phone forms part or all of the mounting interface of the smart phone to the positioning device.

In some embodiments, the positioning apparatus 10 has a lower base 11 which is adapted to reside on fixed object, such as a table top, or the ground. The lower rotating unit 12 is adapted to rotate relative to the lower base 11. The lower rotating unit 12 may be movably attached to the lower base 11 such that when the proper commands are sent to the apparatus 10 the lower rotating unit 12 may move as commanded. When the positioning apparatus 10 has been placed on a horizontal surface, the lower rotating unit would rotate around a vertical axis. With the rotation of the lower rotating unit 12, the entire apparatus 10, other than the lower base 11, will also rotate in conjunction with the lower rotating unit 12.

In some embodiments, a second rotating portion allows for rotation around another axis. In the stowed configuration seen in FIGS. 3-5, the second axis is co-axial to the first, vertical axis of the lower rotating unit. The second rotating portion may have an upper base 13 and an upper rotating unit 14 adapted to rotate relative to the upper base 13. The upper base 13 is rotatably attached to the lower rotating unit at a junction 25 between the two portions. The angle between the upper base 13 and the lower rotating unit 12 may be set by hand by the user. The junction may be of sufficient friction that the pieces may be set at any relative position and retain their configuration. There may be a detent feature at the fully deployed position which enhances the holding force at that position.

Figure 6:
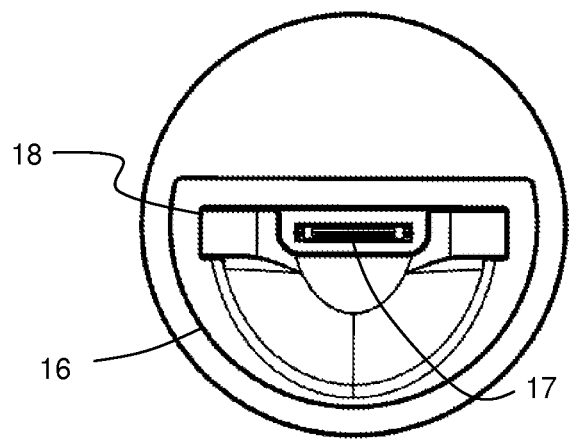
FIG. 6 is a top view of a positioning apparatus according to a first embodiment of the present invention.

FIG. 6 illustrates the top of the upper rotating unit 14 and its adaptation to receive an electronic device, such as a smart phone. A device well 16 on the top of the upper rotating unit 14 allows for the attachment of the electronic unit to the positioning apparatus 10. A device boot 18 may be adapted to fit a particular device, or type of device, such that the device boot 18 enhances the attachment of the electronic device to the upper rotating unit 14. In some embodiments, the device boot 18 may be of a rubberized material, or other resilient material, such that the electronic device is well gripped by the device boot 18. The device boot 18 may be removable and replaceable such that a device boot sized to receive a chosen electronic device is used. A device connector 17 may reside within the bottom of the device well 16. The device connector 17 may be a 30 pin connector in some embodiments. The attachment of the electronic device to the device connector 17 may couple the electronic device to the positioning apparatus both electrically and structurally. The combination of the physical connection of the electronic device to the device connector 17, and the friction of the device boot 18 to the electronic device, may lead to a firm attachment of the electronic device to the positioning apparatus 10, while allowing for easy removal. A port 25 is adapted to receive electronic input into the positioning apparatus 10. In some embodiments, the pot 25 may be a small USB type port.

Figure 7:
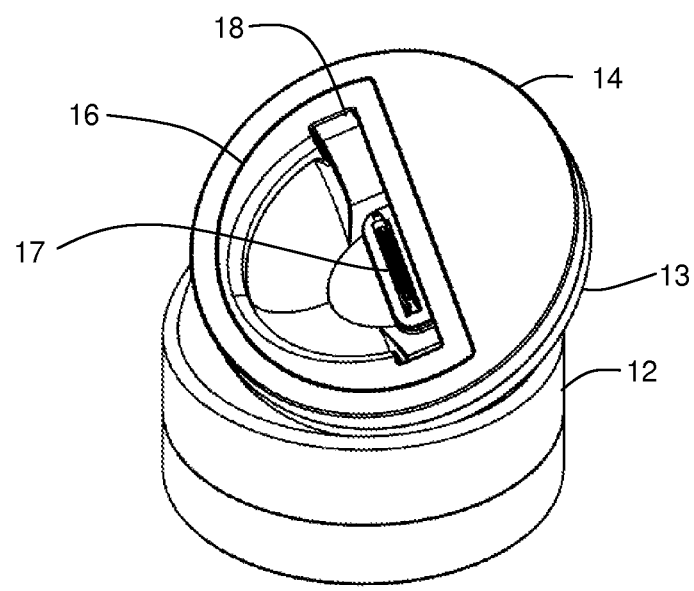
FIG. 7 illustrates a positioning apparatus according to a first embodiment of the present invention.
Figure 8:
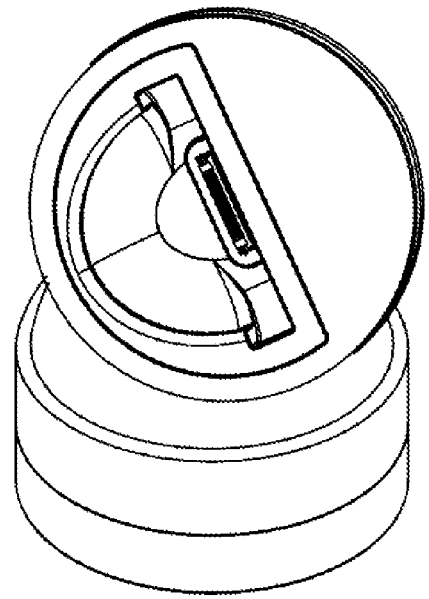
FIG. 8 illustrates a view of a positioning apparatus according to a first embodiment of the present invention.
Figure 9:
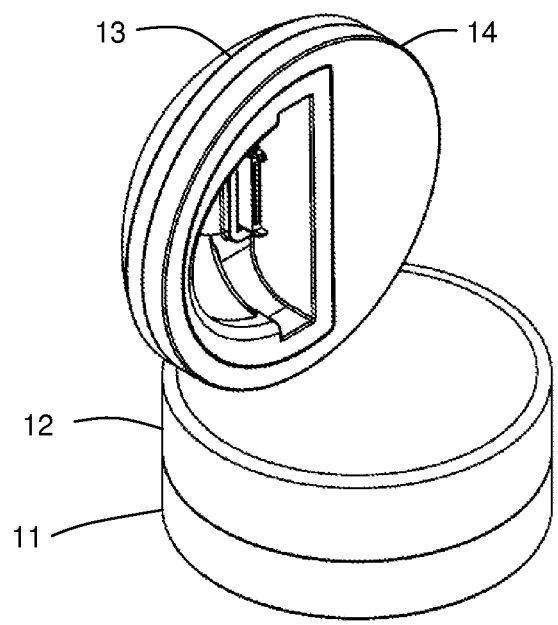
FIG. 9 illustrates a view of a positioning apparatus according to a first embodiment of the present invention.

FIG. 7 illustrates a configuration wherein the upper rotating unit 14 and the upper base 13 have been set at an angle relative to the lower base 11 and the lower rotating unit 12. In this configuration, the two rotation axis are no longer coaxial. FIG. 8 illustrates a configuration wherein the upper rotating unit has been set an even a further angle than that seen in FIG. 7. FIG. 9 illustrates a configuration wherein the upper rotating unit has been fully deployed. In this aspect, the rotation axis of the upper rotating unit is perpendicular to the rotation axis of the lower rotating unit. In this fully deployed configuration, a camera, such as a camera on a smart phone, would be able to be rotated in two axes such that any sought after view could be achieved.

FIGS. 9-12 illustrate a configuration of the positioning apparatus 10 wherein the rotation axis of the lower rotating unit is vertical, and the rotation of the upper rotating unit is horizontal.

Figure 10:
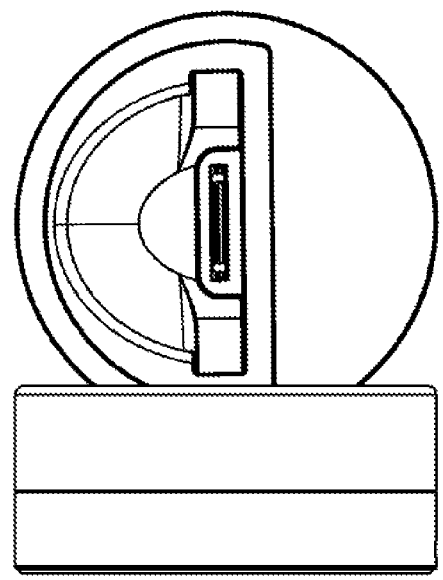
FIG. 10 is a front view of a positioning apparatus according to a first embodiment of the present invention.
Figure 11:
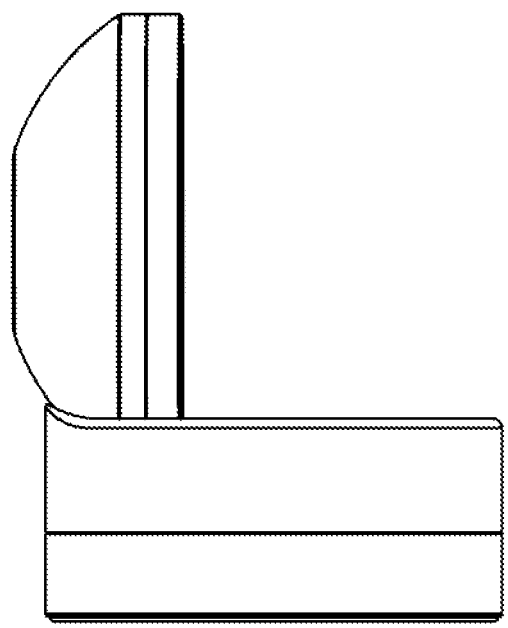
FIG. 11 is a side view of a positioning apparatus according to a first embodiment of the present invention.
Figure 12:
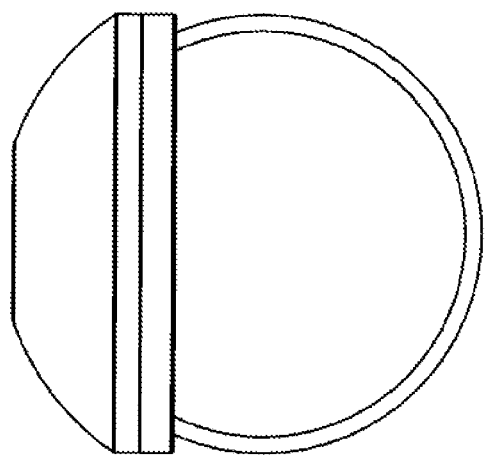
FIG. 12 is a top view of a positioning apparatus according to a first embodiment of the present invention.
Figure 13:
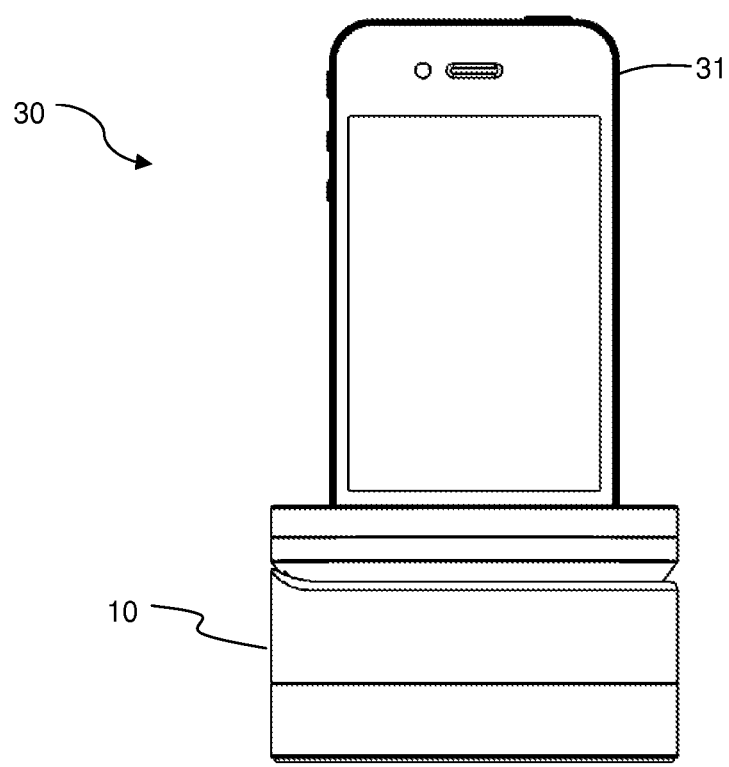
FIG. 13 is a front view of a positioning system according to some embodiments of the present invention.
Figure 14:
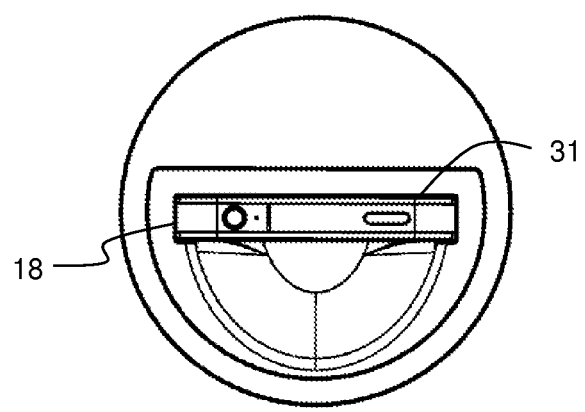
FIG. 14 is a top view of a positioning system according to some embodiments of the present invention.
Figure 15:
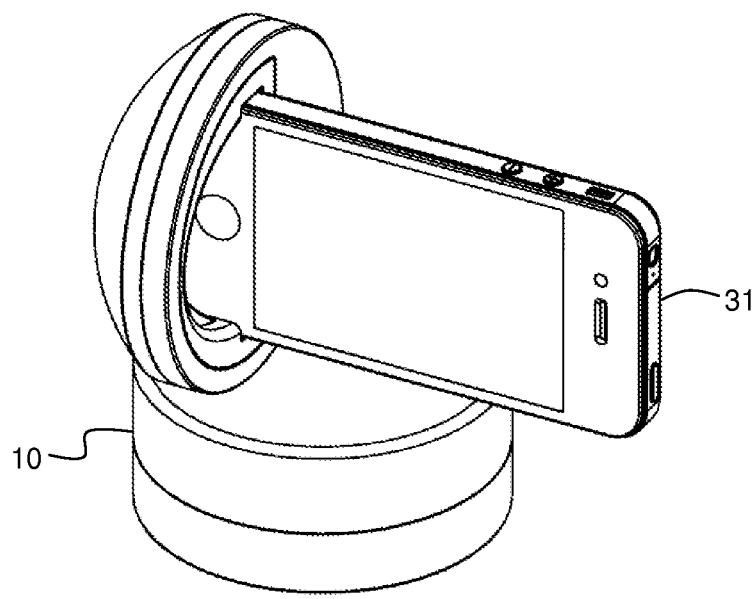
FIG. 15 is a perspective view of a positioning system according to some embodiments of the present invention.
Figure 16:
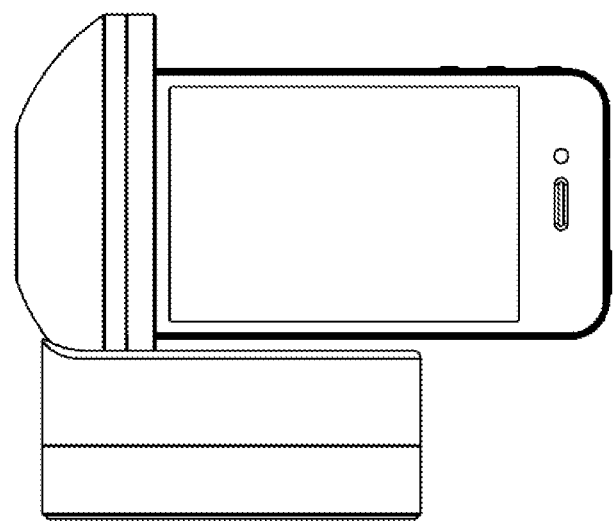
FIG. 16 is a side view of a positioning system according to some embodiments of the present invention.
Figure 17:
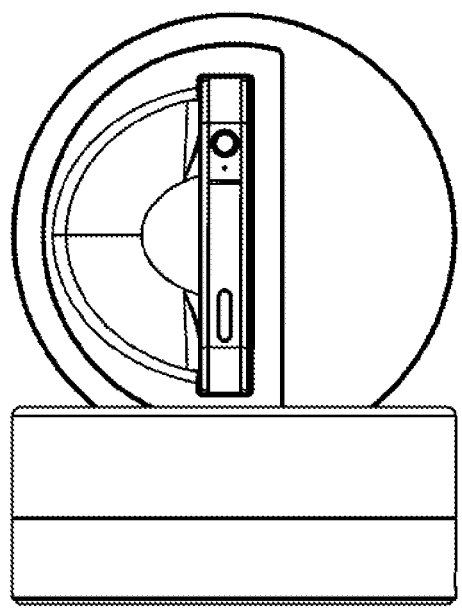
FIG. 17 is a view of a positioning system according to some embodiments of the present invention.
Figure 18:
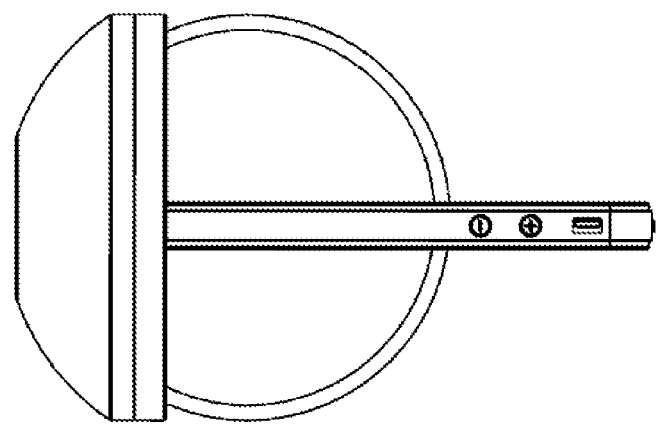
FIG. 18 is a view of a positioning system according to some embodiments of the present invention.

FIGS. 10 and 11 illustrate a positioning system 30 with an electronic device 31, which may be a smart phone, mounted in a positioning apparatus 10. The electronic device 31 is seen to fit snugly in the device boot 18. In this configuration, which may be referred to as a stowed configuration, the upper rotating unit has not been rotated around the junction 25. FIGS. 15-18 illustrate a positioning system 30 in a fully deployed configuration, where in the rotation axis of the upper rotating unit is perpendicular to the rotation axis of the lower rotating unit. In this fully deployed configuration, the camera portion of the electronic device 31 may be able to be rotated to any orientation with the use of the two rotating units.

In some embodiments, the positioning device has electric motors adapted to drive ring gears mounted within the device. Is some embodiments, the base of the device contains a first ring gear driven by an electric motor. A second ring gear is driven by a second motor to provide positioning control in a second axis. The base of the device may contain batteries which provide electrical power for the positioning control of the device. In some embodiments, the batteries may be rechargeable and may be recharged by connecting the base to an electrical power source. In some embodiments, the electrical power may connect via a USB type connector in the base. In some embodiments, the electrical power supplied to the base may be used to provide power for, or to recharge, the smart phone mounted in the base as well. In some embodiments, the batteries of the smart phone may provide the power for the positioning device.

Figure 19:
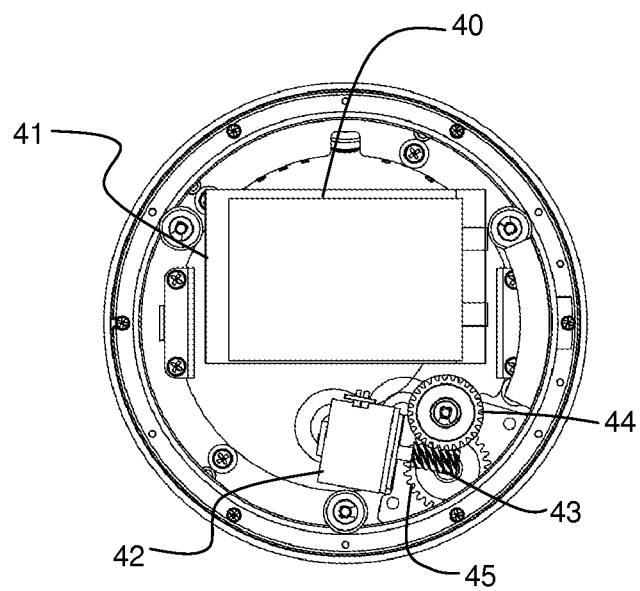
FIG. 19 is an illustration of the interior of the base unit of a positioning apparatus according to some embodiments of the present invention.
Figure 20:
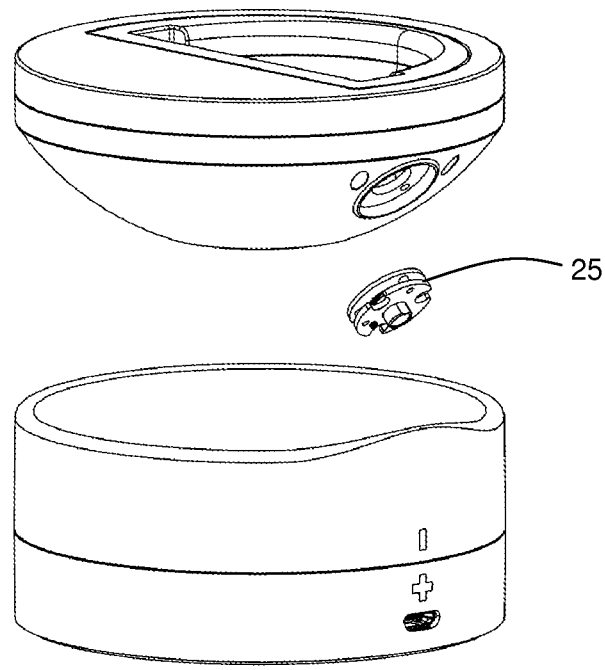
FIG. 20 is an illustration of aspects of the relationship between components of a positioning apparatus according to some embodiments of the present invention.

FIG. 19 illustrates aspects of the drive portion of the lower rotating unit. In the lower portion of the positioning apparatus 10, a ring gear is mounted within the inner periphery of the lower base 11. The lower rotating unit 12 houses components which allow the lower rotating unit 12 to rotate relative to the lower base 12, which may remain fixed upon a surface. Within the lower rotating unit 12 is a motor 42 with a worm gear 43 affixed to its output shaft. The motor 42 may be a stepper motor in some embodiments. The motor may be an 18 degree stepper, and with the full gearing the output angle of the lower rotating unit relative to the lower baser unit may be 0.171 degrees. In addition, the control electronics of the system may be adapted to step the stepper motor at even smaller intervals, such that each 18 degree step may be further broken into 32 micro steps. A gear train 44, 45 leads to an interior ring gear affixed to the lower base. A battery 40 and a lower electronics 41 are adapted to provide step control and power to the motor 42 such that the lower rotating unit 12 rotates relative to the lower base 11. In some aspects, electrical power may be delivered via the port 15 in the lower base 11. A rotary sliding contact assembly between the lower base 11 and the lower rotating unit 12 is adapted to transfer electrical connection from the port 15 to the lower electronics 41. In some aspects, electrical power may be delivered from the battery 40 up to the upper electronics via wires within the junction 25. In some aspects, electrical power and signal may be delivered down to the lower electronics 41 from the upper portion via wires within the junction 25.

Figure 21:
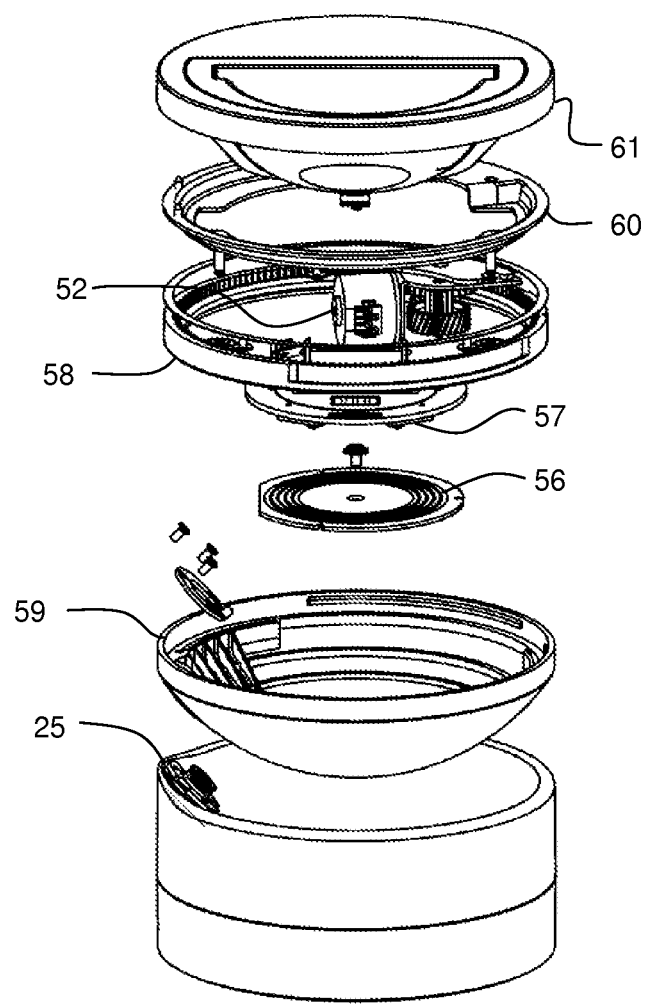
FIG. 21 is an illustration of aspects of the relationship between components of a positioning apparatus according to some embodiments of the present invention.

FIG. 21 illustrates a partial view of an exploded illustration of the upper rotating portion. A similar drivetrain and electronics as seen in the lower portion is again seen in the upper portion. The upper base is seen to have an upper base shell 59 to which is affixed an upper base structure 58, with an internal ring gear 52 attached therein. The upper base shell 59 couples to the junction 25. The upper rotating portion has an upper rotating unit structure 60 and an upper rotating portion top 61. An upper motor 52 is adapted to drive the gear train in response to signal from an upper electronics affixed within the upper rotating portion. A rotating sliding contact assembly 56, 57 allows for transfer of electrical power and signal from the upper rotating unit 14 to the upper base 13.

In some aspects, the sliding contact assemblies allow for the continuous rotation of each of the rotating portions relative to their bases, as may be desired during continuous tracking of an object by a camera. In some aspects, the junction may not be adapted to rotate more than from the stowed to the fully deployed configuration, although this may be done in either direction. Wires may be used to transfer power and signal from the upper base to the lower rotating unit. The rotating portions may house the motor and drive electronics, while the base portions have ring gears. In this aspect, the motors and drive electronics may drive themselves around the inside of the ring gears.

In some embodiments of the present invention, a single axis positioner 80 is adapted to rotate an electronic device, such as a tablet computer 84. The positioner 80 may include a recess 81 adapted to receive a tablet computer 84. A base 83 may reside on a surface, and a rotating portion 82 may rotate relative to the base 83. Aspects of the single axis positioner with regard to drive components may be substantially similar to the components described above with regard to other embodiments. The tablet computer 84 may act as a driver for the positioner 80 using a wireless technology, such as Bluetooth.

The multi-axis positioning control allows a camera mounted onto the positioning device to take pictures at multiple orientations around the location at which the positioning device is placed. The positioning device may also be able to be controlled in a dynamic sense, in that the rate of change in position (speed) may also be controlled. This may be important when the camera is used to track a moving object. In some embodiments, the positioning device contains control electronics which are adapted to position the camera based upon direction and speed inputs for two axes. In some embodiments, three axes may be controlled.

In some embodiments of a system using a positioning device and an electronic device, such as a smart phone, the smart phone may contain instructions for allowing operation of the system according to a variety of operational modes. In some modes, the system may operate according to a preselected paradigm, such as creating a panorama image. In this case, the camera may move from location to location, taking a still image at each position. In another mode, the camera may rotate around a 360 degree range to make a panoramic video from a single location. In some embodiments, an adaptor may be used to hold a device otherwise not designed to held in the standard dock.

In some modes, pre-programmed operational paradigms may reside within the memory of the smart phone. The user may select the paradigm using the smart phone itself. In some aspects, the smart phone may be accessible remotely, such as via the internet. In these aspects, the user may select the operational paradigm remotely.

In some modes, the system may be controllable in real time, such as a remote user using a device, such as a computer or another smart phone to command the camera/positioning device combination to selected orientations in real time.

Figure 23:
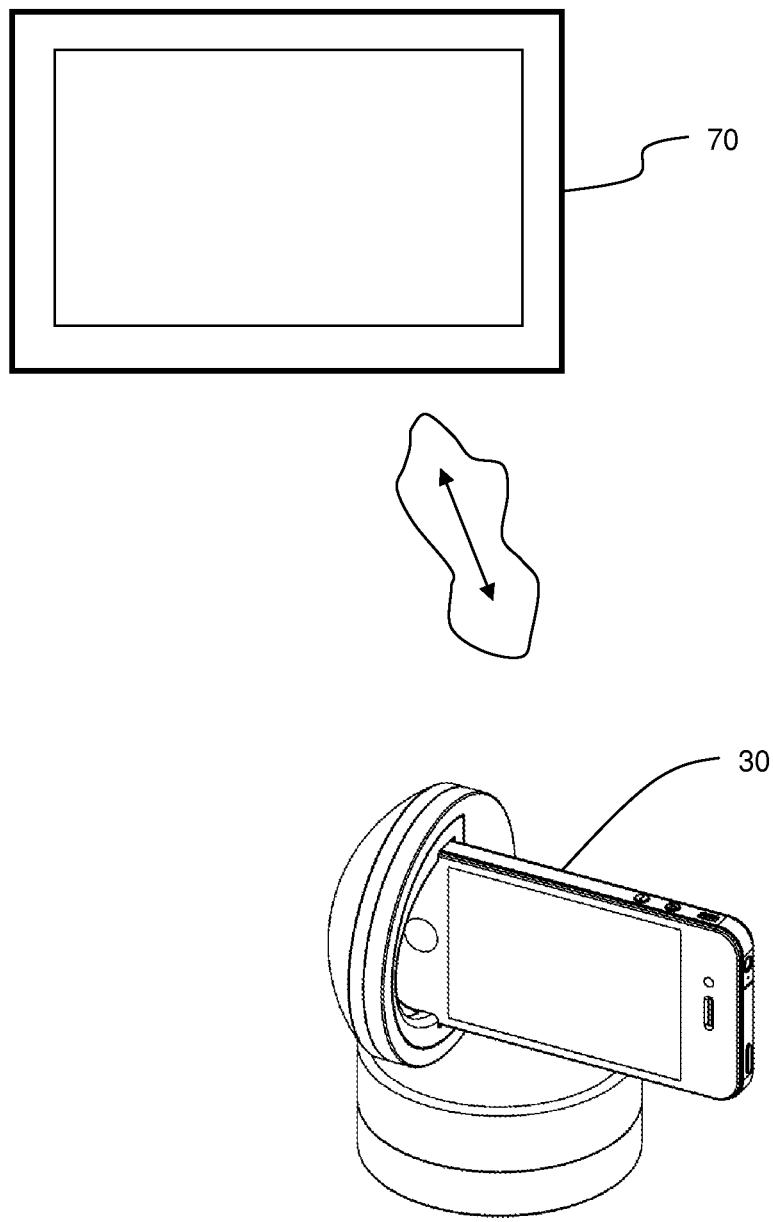
FIG. 23 is an illustrations of a positioning system with a driver according to some embodiments of the present invention.
Figure 24:
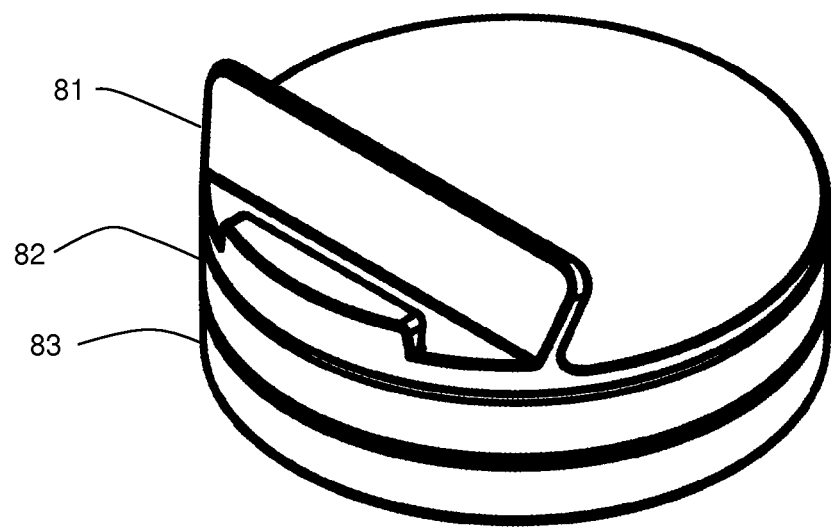
FIG. 24 is a perspective view of a positioning system according to a second embodiment of the present invention.
Figure 25:
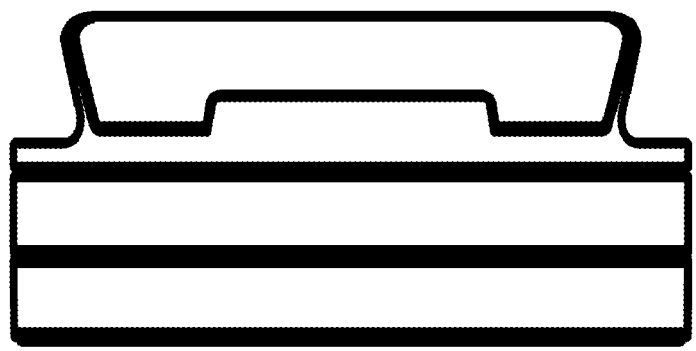
FIG. 25 is a front view of a positioning apparatus according to a second embodiment of the present invention.
Figure 26:
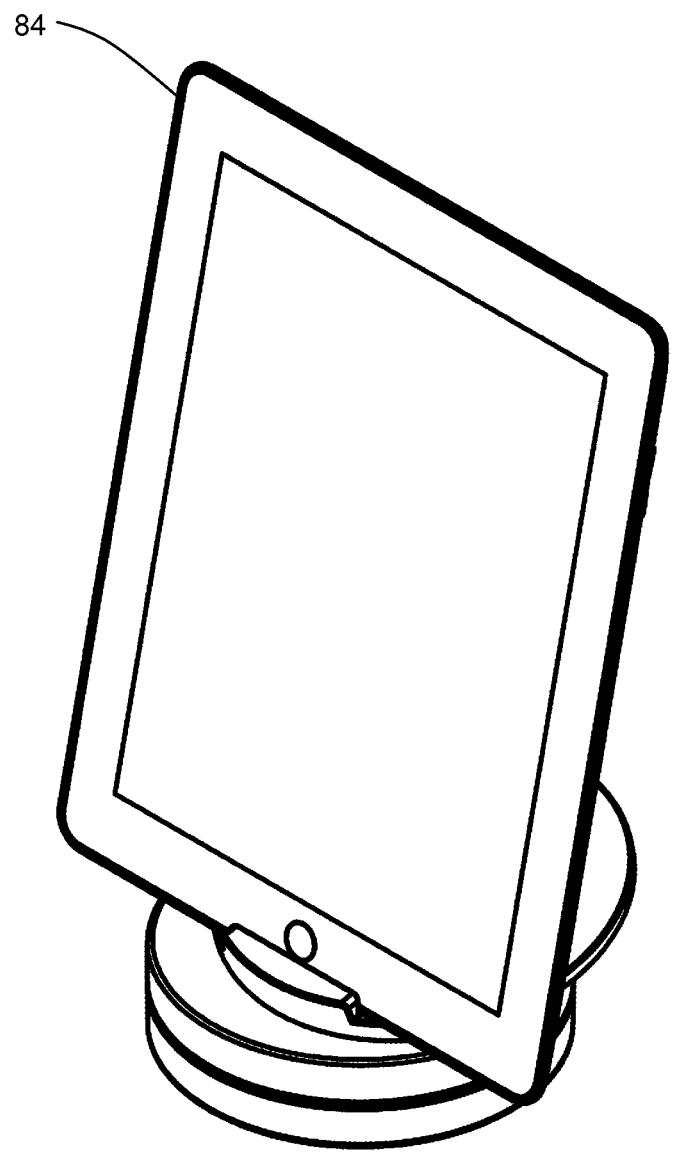
FIG. 26 is a perspective view of a positioning system according to a second embodiment of the present invention.
Figure 27:
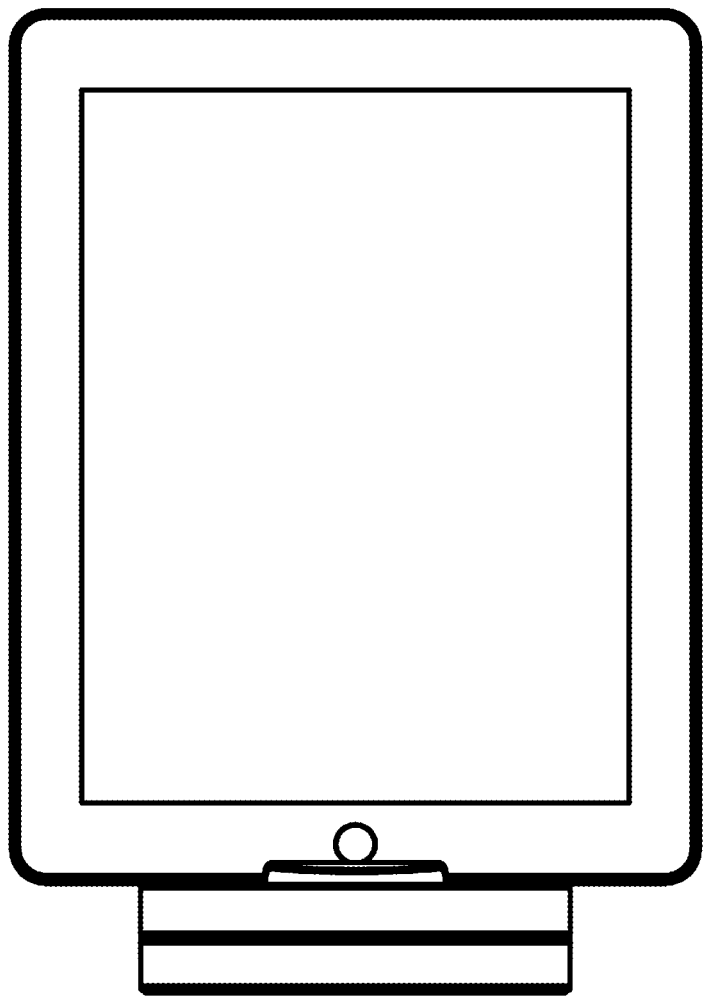
FIG. 27 is a front view of a positioning system according to a second embodiment of the present invention.
Figure 28:
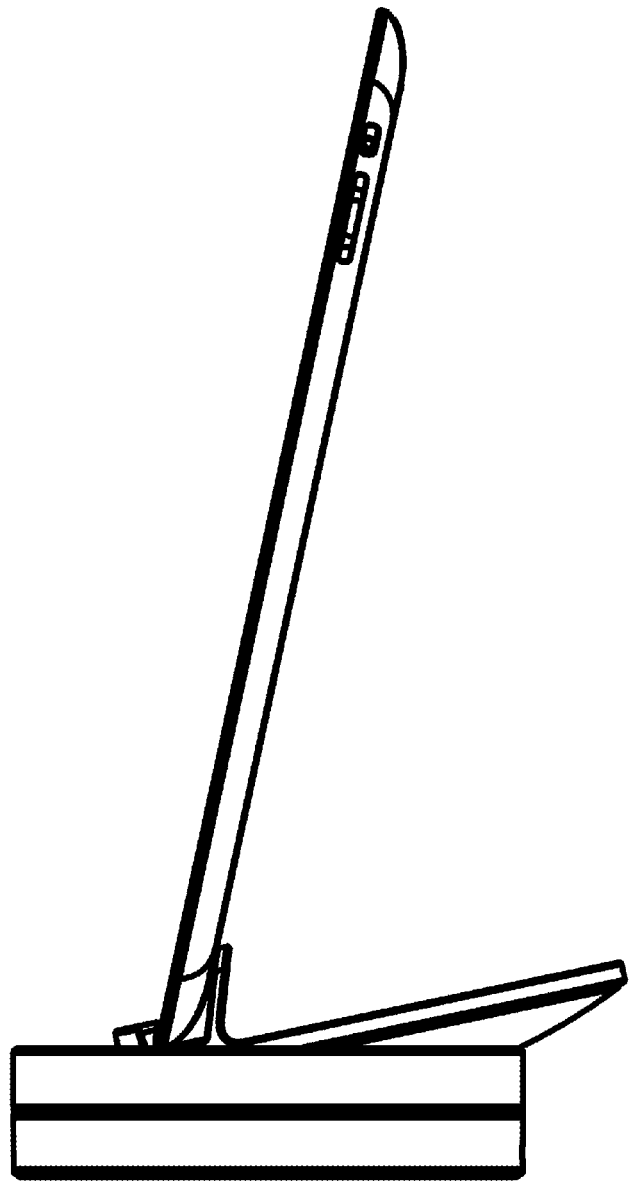
FIG. 28 is a side view of a positioning system according to a first embodiment of the present invention.

In some embodiments, as seen in FIG. 23, the multi-axis positioning assembly 30, and the camera mounted therein, may be controlled by a remote driver 70. The remote driver may be linked to the positioning mechanism by a wi-fi or cellular network, for example. The expanded system using a remote driver may be part of a system that allow for video chat, or of active tracking by the camera in real time. Examples of this expanded system may utilize a personal computer, or a mobile touch device, for example.

In some embodiments, the remote driver may be a laptop or PC. Control may be through either a web App (chrome, Firefox or IE) or stand-alone program (skype, Google video, facebook video, Apple Face Time). Control may be through mouse gestures or clicks on the video being seen and sent by the positioning base unit. Control may also be via 3D mouse, track ball, touch pad, eye tracking or other input device.

In some embodiments, the remote driver may be a mobile touch device. Control may by way of swiping a finger across the remote driver screen to move the positioning base unit in the desired direction. Control may also be by using the remote driver accelerometers and gyros to send position commands. The positioning unit would mimic the same orientation as the remote driver. In some embodiments, a pinching gesture may be used to control optical or digital zoom of the camera on the positioning unit.

Any device directly connected to positioning unit and sending control commands may be referred to as a driver. Examples include an iPhone, an iPod Touch, other mobile devices, or a PC. A Driver can be connected in 4 ways. 1)

Expansion Port 1, 2) USB plugged into the side of positioning unit, 3) the 30 pin connector in the Dock, 4) Expansion Port 2. A driver can also be used to preprogram movements and other commands into the onboard PIC, and be disconnected from the positioning unit once programming is complete. The program would then be executed after a duration of time, at a set time, or by way of trigger signal from an expansion port or the USB port. The trigger could also be the rotation of the positioning unit to a set position such as the battery level indicator position. The trigger could also be an IR Remote.

In some embodiments, the system may utilize a positioning unit with an electronic device, such as a smart phone, utilized as a driver, which is coupled to a remote driver, such as another smart phone or a tablet computer, which has sensors such as internal gyros, accelerometers, and/or magnetometers. In some modes, the positioning unit and the smart phone mounted thereon may be positionally commanded by the movement of the remote driver. For example, should a user viewing images taken by the positioned device, transmitted to an then viewed from a remote viewing tablet or other viewing device, desire to see to the left of the viewed image (as seen on the tablet screen), the user would rotate the viewing tablet to the left (counter-clockwise as viewed from above) resulting in a pan of the positioning unit and its mounted smart phone to the left. In this way, attitude linking of the driver and the positioning unit and imaging smart phone may be achieved.

In an example of such embodiments, a system may comprise a positioning unit with a smart phone residing therein. The smart phone may include an application adapted to couple to a remote driver. The smart phone may also include a camera which may take video images. The remote driver may be a tablet computer which is at a remote location. A user may be using the remote driver to view images taken by the smart phone while in the positioning unit.

An example of the steps involved may be as follows. The system may be started such that the smart phone is mounted onto the positioning unit. The smart phone may have an application running adapted to support the system function. The smart phone is coupled to a remote driver, which may be a tablet computer. The user may hold the tablet computer, which displays images taken by the camera within the smart phone. The images may be video images. The tablet computer/remote driver may have internal sensors such as accelerometers, gyros, and other position, attitude, and acceleration sensors. The user may pan or tilt the tablet computer. The sensors in the tablet computer provide output which includes information on the change in attitude of the tablet computer. This information is transmitted to the smart phone in processed or unprocessed form. The transmission of this data may take place over a wireless phone network, over the internet, over a wireless intranet, or other means. The smart phone receives the information related to the change in attitude of the driver. The smart phone, functioning as the driver of the positioning unit, then commands the positioning unit to move the smart phone in concert with the tablet. For example, if the tablet has been rotated clockwise (as viewed from above), the smart phone would then also be rotated clockwise by the positioning unit.

In some embodiments, the driver may determine the rates of rotation of the driver as moved by the user. The driver may then send this information to the smart phone. The smart phone may then command the positioning unit to rotate at the same rate and for the same duration as determined by the driver based upon its sensor input. The user then is able to view images on the tablet that simulate the experience of having turned the remote smart phone and positioning unit assembly. In some embodiments, the positioning unit may be limited to 2 axes of movement, which may be pan and tilt. In some embodiments, the positioning unit may move the smart phone in three axes.

In some embodiments, the smart phone on the positioning unit may have its own attitude sensors which may provide output that can be used to verify or correlate that the commands given to the positioning unit, based upon the motion of the driver, have been accurately implemented. In some modes, the system may have autonomous tracking modes which allow the images taken by the camera to be analyzed, with data from this analysis used to provide positioning commands. For example, an object of interest could be selected, and once selected the camera may track the object of interest.

In some embodiments, the system may be used to implement time lapse photography or cinemaphotography. With an App on the driver the system can be programmed to run Time lapse sequences or smooth video sequences. The system may be set to go from point A to point B in X amount of time, then go to further points and so on. Shot frequency can be set for time lapse usage. Programming the number of degrees to move, which axis, at what speed for each part of the sequence. This may all be done within an App on the driver.

In some embodiments, the application residing on the driver may be adapted to teach positions by moving the Pan and Tilt axis to the desired position for each step of the sequence, and then either setting the amount of time between positions or the speed to go to each position. The number of frames to shoot can also be set for time lapse applications. The user may also utilize a remote driver to move the system to each position desired for the sequence. This way the user can easily see exactly what the system will see at each position along the sequence. The user may also use a preprogrammed sequence from a saved list or downloaded from the internet. Position programming can also be used for Multi Parallel Time Lapse. This is where the system is programmed to cycle between 2 or more positions and shoot a frame at each position. The result will be multiple Time Lapse videos created over the same period of time. The app running this would name each frame captured with a location name and image number for that location. Then it's a simple matter of sorting the images and compiling them into a video sequence. The App could also use image recognition to precisely align the system with the last frame taken.

In some embodiments, the system may facilitate two way video conferencing. In some embodiments, the system may facilitate two way video conferencing with tracking. For example, two users may each have a viewing screen such as a tablet computer, or fixed screen. Each user may also have a positioning unit with a device such as a smart phone which is adapted to take video images of the adjacent user during the video call. One or each of the imaging units may be adapted to track the adjacent user during the call.

In some embodiments, the system may be used with motion sensors, or other sensors, that trigger a tracking mode. In some embodiments, the activation of motion sensors may also instigate a call or other action from the smart phone to another number, so that a user can know of the triggering by the motion sensor. At that time, the user may be able to control the position of the camera for viewing.

Figure 22:
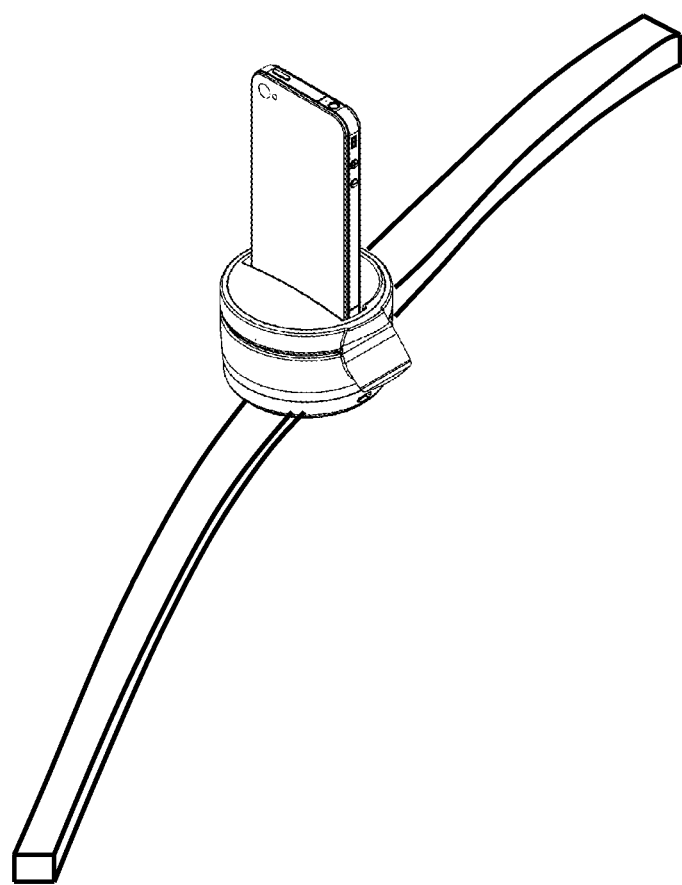
FIG. 22 is an illustration of a rail system according to some embodiment of the present invention.

In some embodiments of the present invention, as seen in FIG. 22, a system uses the positioning mechanism as described in part above along with a further tracking mechanism adapted to move the base unit along a rail. The control of the system may utilize commands which move the base unit to different positions as part of pre-programmed paradigms or in real-time command mode.

In some embodiments of the present invention, the control of the positioning mechanism may be controlled by a driver over a long distance. In some aspects, the driver may be coupled to the positioning mechanism over the internet. For example, the driver could be connected to the internet via a wireless internet signal. Similarly, the positioning mechanism could be connected to the internet via a wireless connection to the internet. In some aspects, the positioning mechanism could be coupled over long distance to the driver using a cell phone signal, such as over a 3G or 4G network. The long distance connection can provide control of the positioning mechanism from the driver as well as transmission of the video signal back to the driver.

In some embodiments of the present invention, the control of the positioning mechanism may be done locally. The positioning mechanism, which may include a video camera mounted thereon, may couple to the driver over a wireless router in some aspects. In some aspects, a local hotspot may provide the coupling of the positioning mechanism to the driver.

In some embodiments, the driver may be used to allow for manual tracking of an event from a device mounted upon a positioning unit. For example, a video camera may be mounted on a positioning unit. The video camera may be part of a smart phone which includes capability to run an application. The video camera and positioning unit may be placed upon a solid mounting location which may allow for imaging with a minimum of jitter. The user may have a handheld device such as another smart phone. The handheld smartphone may be coupled to the positioning unit mounted smart phone such that the handheld smart phone can display the image taken by the positioning unit smart phone. The user may view the image and pan or tilt the handheld unit so that the positioning unit mounted camera tracks according to the desires of the user, which are relayed by rotating the driver. The user can view, in real time, that the positioning unit mounted camera has responded to the movement commands. This system allows the user to control the camera in the positioning unit, which is not subject to the jitter that the handheld unit may be experiencing. The transmission of the images to the handheld unit, which is done to facilitate this functionality, may be of low quality so that bandwidth is not a limiting factor. However, the image recorded by the camera in the positioning unit may be of high quality, and also not subject to jitter as the handheld may be.

In some embodiments of the present invention, the positioning mechanism with the camera/video camera mounted thereon may be under autonomous control. In such a case, the positioning mechanism/camera system may not be under outside control and instead operates autonomously. Such aspects may include time-lapse photography applications, for example.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A system for imaging, said system comprising:
a positioning base unit, said first positioning base unit comprises:
   a first positioning mechanism portion adapted to rotate a first portion of said positioning base unit around a first axis; and
   a second positioning mechanism portion adapted to a second portion of said positioning base unit around a second axis, wherein said first positioning mechanism portion is coupled to said second positioning mechanism portion with a rotatable coupling; and
an electronic device removably attached to said positioning base unit, wherein said electronic device comprises:
   a camera; and
   electronics adapted to provide positioning commands to said positioning base unit,
wherein said rotatable coupling is adapted to rotate said first positioning mechanism portion relative to said second positioning mechanism portion along a range from a first position wherein said first axis and said second axis e parallel, to a second position wherein said first axis and said second axis are perpendicular.

2. The system of claim 1 wherein said positioning base unit comprises control electronics adapted to drive said first and said second positioning mechanism portions.

3. The system of claim 2 wherein said electronic device is a smart phone, and wherein said smart phone comprises a program application adapted to send position commands to said positioning base unit.

4. The system of claim 3 wherein said program application comprises instructions for the tracking by said camera of an imaged object.

5. The system of claim 1 further comprising a remote driver, said remote driver coupled to said positioning base unit, said remote driver adapted to provide positioning commands to said electronic device.

6. The system of claim 5 wherein said remote driver is coupled to said positioning base unit via a wireless network.

7. The system of claim 6 wherein said remote driver comprises a mobile touch device.

8. A positioning base unit, said positioning base unit comprising:
a first positioning mechanism portion adapted to rotate a first portion of said positioning base unit around a first axis, said first positioning mechanism portion comprising a first base portion and a first rotating portion; and
a second positioning mechanism portion adapted to a second portion of said positioning base unit around a second axis, said second positioning mechanism portion comprising a second base portion and a second rotation portion,
wherein said first positioning mechanism portion is coupled to said second positioning mechanism portion with a rotatable coupling, and
wherein said rotatable coupling is adapted to rotate said first rotating portion relative to said second base portion along a range from a first position wherein said first axis and said second axis are parallel, to a second position wherein said first axis and said second axis are perpendicular.

9. The positioning base unit of claim 8 wherein said first rotating portion comprises:
a first motor; and
control electronics for said first motor.

10. The positioning base unit of claim 9 wherein said second rotating portion comprises:
a second motor; and
control electronics for said second motor.

11. The positioning base unit of claim 10 wherein said first base portion is electrically coupled to said first rotating portion with sliding contacts adapted for continuous rotation.

12. The positioning base unit of claim 11 wherein said second base portion is electrically coupled to said second rotating portion with sliding contacts adapted for continuous rotation.

* * * * *